(12) United States Patent
Isozaki

(10) Patent No.: US 6,521,286 B2
(45) Date of Patent: Feb. 18, 2003

(54) METHOD FOR MANUFACTURING A MAGNETIC RECORDING MEDIUM

(75) Inventor: Makoto Isozaki, Nagano (JP)

(73) Assignee: Fuji Electric Co., Ltd., Kawasaki (JP)

( * ) Notice: Subject to any disclaimer, the term of this patent is extended or adjusted under 35 U.S.C. 154(b) by 0 days.

(21) Appl. No.: 10/055,622

(22) Filed: Jan. 23, 2002

(65) Prior Publication Data

US 2002/0160106 A1 Oct. 31, 2002

(30) Foreign Application Priority Data

Jan. 24, 2001 (JP) ........................................ 2001-016257

(51) Int. Cl.$^7$ ................................................. B05D 5/12
(52) U.S. Cl. ........................ 427/130; 427/131; 427/136; 427/346; 427/352; 427/407.1
(58) Field of Search ................................. 427/130, 131, 427/336, 346, 352, 407.1

(56) References Cited

FOREIGN PATENT DOCUMENTS

| JP | 58224439 | 10/1983 |
| JP | 62170022 | 7/1987 |

*Primary Examiner*—Bernard Pianalto
(74) *Attorney, Agent, or Firm*—Darby & Darby

(57) ABSTRACT

A lubricating layer is applied to the surface of a thin protective layer on a magnetic recording medium. The surface of the protective layer is burnished to reduce protuberances. The lubricating layer is removed by solvent washing. Then, a replacement lubricating layer is deposited on the surface of the protective layer. The resulting surface of the magnetic recording medium exhibits reduced scratching and particle contamination.

9 Claims, 1 Drawing Sheet

METHOD FOR MANUFACTURING A MAGNETIC RECORDING MEDIUM

BACKGROUND OF THE INVENTION

The present invention relates to a method for manufacturing a magnetic recording medium used in a memory device, in particular a hard disk drive, that is installed in an information memory device of an information processing apparatus such as a computer or any other memory apparatus for private use.

With the present increase in the amount of information handled by information processing apparatus such as a computer, as well as the miniaturization of such an apparatus in recent years, the recording capacity of an information memory device has been enhanced and the recording capacity of a magnetic recording medium used in the information memory device continuously increases. Enhancement of recording density requires a decrease in the bit length. Bit length is the space occupied by a unit of information recording. Minimization of the flying height of a recording head is one technique for reducing the bit length.

To minimize the flying height of the head, eliminating protrusions on the surface of the magnetic recording medium is indispensable. Accordingly, burnishing is conventionally carried out on the surface of the magnetic recording medium using a polishing tape coated with abrasive grains of alumina. Burnishing is usually done after formation of a protective film or before a glide height test after application of liquid lubricant.

However, since the protective film also is being reduced in thickness in recent years, tape-burnishing on the surface of the recording medium after protective film formation generates scratches, which may raise problems in error quality and anti-corrosion.

These problems are significant when a soft plastic substrate is used. The film thickness of a lubricant layer of a recording medium after application of a liquid lubricant on the protective film and before the glide test is at most about 2 nm since the thickness is optimized for attaining good friction characteristics and avoidance of adhesion at head contact. The value of the thickness obtained produces little effect in suppressing scratch generation due to burnishing. Dust and particles are also generated on the surface of the recording medium due to the tape-burnishing. The dust and particles remain after the burnishing process and are drawn into the air stream that is developed by the head flying at low flying height, especially during a seeking operation of the recording medium. As a result, electromagnetic conversion characteristics are significantly affected. In the worst case, head crash occurs, with serious effects on the reliability of the magnetic recording device.

OBJECTS AND SUMMARY OF THE INVENTION

It is an object of the invention to provide a method for producing a magnetic recording medium having improved surface smoothness with reduced scratches and particles on its surface.

Briefly stated, the present invention provides a method for producing a magnetic recording medium in which a lubricating layer is applied to the surface of a thin protective layer on the magnetic recording medium. The surface of the protective layer is burnished to reduce protuberances. The lubricating layer is removed by solvent washing. Then, a replacement lubricating layer is deposited on the surface of the protective layer. The resulting surface of the magnetic recording medium exhibits reduced scratching and particle contamination.

According to an embodiment of the invention, there is provided a method for manufacturing a magnetic recording medium comprising steps of: depositing a non-magnetic metallic under-layer on a substrate, depositing a magnetic layer on the under-layer, depositing a protective layer on the magnetic layer, depositing a lubricating agent on the protective layer, burnishing a surface of the magnetic recording medium, washing the lubricating agent away using a solvent, and depositing a liquid lubricant layer on the protective layer.

A method for burnishing a surface of a magnetic recording medium comprising: depositing a first lubricating layer on the surface, the first lubricating layer being of a type omitting a functional end group, burnishing the surface, solvent washing the surface to remove the first lubricating layer, depositing a second lubricating layer on the surface, and the second lubricating layer being of a type having a functional end group.

The above, and other objects, features and advantages of the present invention will become apparent from the following description read in conjunction with the accompanying drawings, in which like reference numerals designate the same elements.

BRIEF DESCRIPTION OF THE DRAWING

The FIGURE is a cross section showing a layer structure of a magnetic recording medium obtained by an embodiment of a method for manufacturing a magnetic recording medium of the present invention.

DETAILED DESCRIPTION OF THE PREFERRED EMBODIMENT

Figure 1:
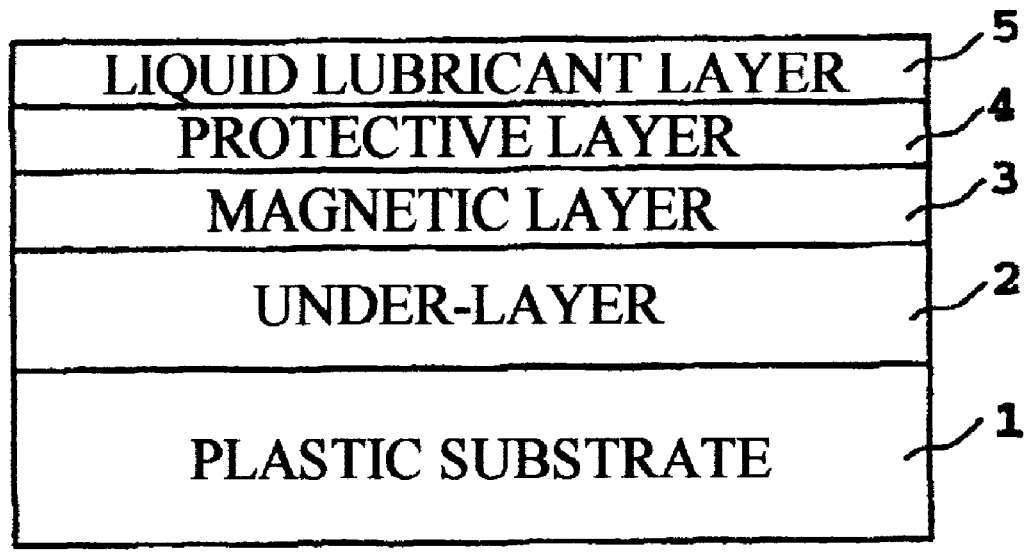

For solving the above problems, the inventor of the present invention energetically conducted repeated experiments and study, and has found the following knowledge.

Application of a lubricating agent with an appropriate thickness, for example 5 to 10 nm, before tape burnishing prevents the generation of scratches. However, if the lubricating agent remains as a liquid lubricant layer, the thickness of the layer is too great, thereby leaving dust in the surface. Such dust adversely affects the characteristics of the recording medium. Consequently, the lubricating agent must be selected to be easily removable after burnishing. After removal, the liquid lubricant layer is formed anew for operation of the recording medium. By these means, the problems of the conventional technology described earlier are solved.

The present invention is accomplished based on the knowledge, and a manufacturing method of a magnetic recording medium according to the invention comprises steps of sequentially laminating a non-magnetic metallic under-layer, a magnetic layer, and a protective layer on a non-magnetic substrate, applying a lubricating agent on the protective layer, burnishing the surface of the laminated substrate that is coated with the lubricating agent, washing the lubricating agent away using a solvent, and laminating a further liquid lubricant layer on the protective layer.

In the construction described above, the lubricating agent has preferably a mean molecular weight of not smaller than 10,000 in order to withstand the friction of tape-burnishing, and preferably the lubricating agent lacks a functional end group in order to permit it to be easily washed away using a solvent. When the lubricant layer is washed away, it carries with it the dust and others contaminants on the surface of the recording medium.

This washing step is preferably performed by means of spin-coating at high rotational speed of not smaller than 1,000 rpm since the dust and particles generated by tape-burnishing can be removed using centrifugal force simultaneously.

EXAMPLES

Referring to the FIGURE 1, an under-layer 2 is formed on a plastic substrate 1, preferably by sputtering. A magnetic layer 3 is then formed on the under-layer 2, also by sputtering. A protective layer 4 is formed on the magnetic layer 3, by sputtering. Finally, a liquid lubricant layer 5 is deposited on the protective layer 4.

Three types of lubricant layer 5 were used:
(a) Brayco 815Z manufactured by Castrol Co., Ltd. applied to a thickness of 10 nm by spin-coating
(b) AM2001 manufactured by Ausimont S.p.A. was applied to a thickness of 2 nm thickness, and
(c) a lubricating layer was omitted.

Each of the three types of recording media was processed by burnishing using a polishing tape WA10000 manufactured by Japan Microcoating Co., Ltd., at a rotating speed of 1,500 rpm, with a pad hardness of 25° and a pushing pressure of 0.04 kgf/cm2. On each of the recording medium after burnishing, the number of scratches was counted using an optical visual inspection apparatus manufactured by Phasemetrics Co., Ltd. The result, that is, a difference from an initial value, is shown in Table 1.

The recording medium of (a) was then washed by spinning at 2,000 rpm using a detergent Fluorinate FC77 manufactured by Sumitomo 3M Co., Ltd., and then coated to the thickness of 2 nm with a liquid lubricant AM2001 manufactured by Ausimont S.p.A. to produce the final liquid lubricant layer 5. The number of particles on this recording medium was measured using the optical visual inspection apparatus. The recording medium (b) was treated in the same manner, and the number of particles was measured using the optical visual inspection apparatus. The recording medium (c), not having an initial liquid lubricant layer 5, received its lubricant layer for the first time and the number of particles was measured. The result, that is, a difference from the initial value, is shown in Table 2.

TABLE 1

|  | Δ number of scratches |
| --- | --- |
| recording medium (a) | 1 |
| recording medium (b) | 6 |
| recording medium (c) | 15 |

TABLE 2

|  | Δ number of particles |
| --- | --- |
| recording medium (a) | 2 |
| recording medium (b) | 12 |
| recording medium (c) | 35 |

These results demonstrate that excellent results are obtained on the recording medium (a), to which the present invention has been applied. That is, the number scratches due to tape-burnishing is reduced and the effect of particle elimination is also confirmed.

According to the method for manufacturing a magnetic recording medium of the present invention, scratches and dust contamination on the surface due to tape-burnishing are prevented by means of application of a lubricating agent before the burnishing and spinning washing using a solvent after burnishing.

Having described preferred embodiments of the invention with reference to the accompanying drawings, it is to be understood that the invention is not limited to those precise embodiments, and that various changes and modifications may be effected therein by one skilled in the art without departing from the scope or spirit of the invention as defined in the appended claims.

What is claimed is:

1. A method for manufacturing a magnetic recording medium comprising steps of:
   depositing a non-magnetic metallic under-layer on a substrate;
   depositing a magnetic layer on said under-layer;
   depositing a protective layer on said magnetic layer;
   depositing a lubricating agent on said protective layer;
   burnishing a surface of said protective layer having said deposited lubricating agent;
   washing said lubricating agent away using a solvent; and
   depositing a liquid lubricant layer on said protective layer.

2. A method for manufacturing a magnetic recording medium according to claim 1, wherein said lubricating agent is of a type which does not include a functional end group.

3. A method for manufacturing a magnetic recording medium according to claim 1, wherein:
   said step of washing comprises a process of spin-coating a solvent on a surface of laminated substrate at a rotating speed of not less than 1,000 rpm after said step of burnishing; and
   said step of depositing a liquid lubricant layer includes applying a liquid lubricant having a functional end group.

4. A method for burnishing a surface of a magnetic recording medium comprising:
   depositing a first lubricating layer on said surface;
   said first lubricating layer being of a type omitting a functional end group;
   burnishing said surface;
   solvent washing said surface to remove said first lubricating layer;
   depositing a second lubricating layer on said surface; and
   said second lubricating layer being of a type having a functional end group.

5. A method according to claim 4, wherein said first lubricating layer has a thickness exceeding about 5 nm.

6. A method according to claim 5 wherein said first lubricating layer has a thickness of from about 5 to about 10 nm.

7. A method according to claim 4, wherein said second lubricating layer has a thickness substantially less than said first lubricating layer.

8. A method according to claim 7, wherein said second lubricating layer has a thickness of about 2 nm.

9. A method according to claim 4, wherein said first lubricating layer has a molecular weight of at least 10,000.

* * * * *